(12) United States Patent
Wolfson et al.

(10) Patent No.: US 10,473,779 B2
(45) Date of Patent: Nov. 12, 2019

(54) LARGE RESISTIVE VEE DIPOLE ANTENNA COMBINED WITH VEE DIPOLE ARRAY

(71) Applicant: Chemring Sensors and Electronic Systems, Inc., Dulles, VA (US)

(72) Inventors: Jason T. Wolfson, Chantilly, VA (US); Ali Etebari, Leesburg, VA (US)

(73) Assignee: Chemring Sensors and Electronics Systems, Inc., Dulles, VA (US)

(*) Notice: Subject to any disclaimer, the term of this patent is extended or adjusted under 35 U.S.C. 154(b) by 226 days.

(21) Appl. No.: 15/584,366

(22) Filed: May 2, 2017

(65) Prior Publication Data
US 2018/0329051 A1 Nov. 15, 2018

Related U.S. Application Data

(62) Division of application No. 13/481,040, filed on May 25, 2012, now Pat. No. 9,671,494.

(60) Provisional application No. 61/490,910, filed on May 27, 2011.

(51) Int. Cl.
| | |
|---|---|
| *G01S 13/88* | (2006.01) |
| *G01V 3/12* | (2006.01) |
| *G01V 3/17* | (2006.01) |
| *H01Q 9/44* | (2006.01) |
| *H01Q 21/28* | (2006.01) |
| *G01S 7/03* | (2006.01) |
| *H01Q 21/00* | (2006.01) |

(52) U.S. Cl.
CPC ............ *G01S 13/885* (2013.01); *G01S 7/03* (2013.01); *G01V 3/12* (2013.01); *G01V 3/17* (2013.01); *H01Q 9/44* (2013.01); *H01Q 21/00* (2013.01); *H01Q 21/28* (2013.01)

(58) Field of Classification Search
CPC ......... G01S 13/885; G01S 7/03; H01Q 21/00; H01Q 9/44; H01Q 21/28; G01V 3/12; G01V 3/17
USPC .......................................................... 342/22
See application file for complete search history.

(56) References Cited

U.S. PATENT DOCUMENTS

| | | | | |
|---|---|---|---|---|
| 5,720,354 A | * | 2/1998 | Stump ..................... | E21B 7/046 175/26 |
| 7,042,385 B1 | * | 5/2006 | Wichmann ............ | G01S 13/885 342/22 |
| 8,933,841 B2 | * | 1/2015 | Valaee .................. | H04W 64/00 342/451 |
| 2005/0212604 A1 | * | 9/2005 | Cyr .......................... | H01L 24/48 331/16 |
| 2008/0185903 A1 | * | 8/2008 | Bausov ................... | E21C 27/24 299/1.2 |
| 2010/0066585 A1 | * | 3/2010 | Hibbard ................ | G01S 13/106 342/22 |
| 2010/0277397 A1 | * | 11/2010 | Scott ....................... | G01D 1/00 343/904 |

* cited by examiner

*Primary Examiner* — Frank J McGue
(74) *Attorney, Agent, or Firm* — Finnegan, Henderson, Farabow, Garrett & Dunner LLP

(57) ABSTRACT

A radar array comprising a panel, the panel comprising a top side and a bottom side; a plurality of high-frequency antennas coupled into a high-frequency array coupled to the panel; at least one low-frequency resistive vee dipole transmitting antenna; and at least one low-frequency resistive vee dipole receiving antenna, wherein the at least one low-frequency resistive vee dipole transmitting antenna and the at least one low-frequency resistive vee dipole receiving antenna are coupled into a low-frequency array.

20 Claims, 9 Drawing Sheets ated States 10,473,779 B2

LARGE RESISTIVE VEE DIPOLE ANTENNA COMBINED WITH VEE DIPOLE ARRAY

PRIORITY

This application is a division of U.S. patent application Ser. No. 13/481,040, filed May 25, 2012, entitled "Large Resistive Vee Dipole Antenna Combined with Vee Dipole Array," which claims the benefit of priority from U.S. Provisional Application No. 61/490,910, filed May 27, 2011, both of which are herein incorporated by reference in their entirety.

TECHNICAL FIELD

The present disclosure relates to radar arrays and methods for detecting objects.

BACKGROUND

Ultra-wide bandwidth (UWB) antennas can be used in ground penetrating radar (GPR) arrays for detection of buried objects and threats such as mines and improvised explosive devices (IEDs). An exemplary UWB GPR system can be found in Wichmann (U.S. Pat. No. 7,042,385), the entirety of which is incorporated herein by reference.

SUMMARY

In one aspect, embodiments provide a radar array. The radar array can include a panel, the panel including a top side and a bottom side. The radar array can also include a plurality of high-frequency antennas coupled into a high-frequency array coupled to the panel, at least one low-frequency resistive vee dipole transmitting antenna, and at least one low-frequency resistive vee dipole receiving antenna. In an embodiment, the at least one low-frequency resistive vee dipole transmitting antenna and the at least one low-frequency resistive vee dipole receiving antenna can be coupled into a low-frequency array.

In another aspect, embodiments provide a method for detecting objects buried beneath a surface of a medium. The method can include drawing a high-frequency array and a low frequency array across the surface. The high-frequency array can include a plurality of high frequency antennas and the low-frequency array can include at least one-low frequency resistive vee dipole transmittal antenna and at least one low-frequency resistive vee dipole receiving antenna. The method can also include transmitting a plurality of high-frequency pulses of electromagnetic radiation with the high-frequency array, transmitting a plurality of low-frequency pulses of electromagnetic radiation with the low-frequency array, receiving the plurality of high-frequency pulses with the high-frequency array after interaction with the medium, and receiving the plurality of low-frequency pulses with the low-frequency array after interaction with the medium. The method can also include processing the plurality of high-frequency pulses and processing the plurality of low-frequency pulses.

DESCRIPTION OF EMBODIMENTS

As mentioned above, UWB antennas can be used in GPR arrays for detection of buried objects and threats such as mines and IEDs. Depending upon the antenna geometry and the frequency content of the driving pulses used in a GPR system, the center frequency can be tuned to find large, deep objects, or small, shallow objects. The arrangement described herein can be used to find small, shallow objects as well as large, deep objects. Embodiments consistent with this disclosure can combine a lower center frequency UWB GPR array with a higher center frequency UWB GPR array to yield a wider overall bandwidth. This combination can provide for the detection of large, deeply buried objects with the low center frequency array and the detection of small, shallow objects with the high center frequency array. In embodiments consistent with this disclosure, the lower center frequency UWB GPR array can be integrated into presently existing high frequency arrays without changing the current panel design.

Figure 1:
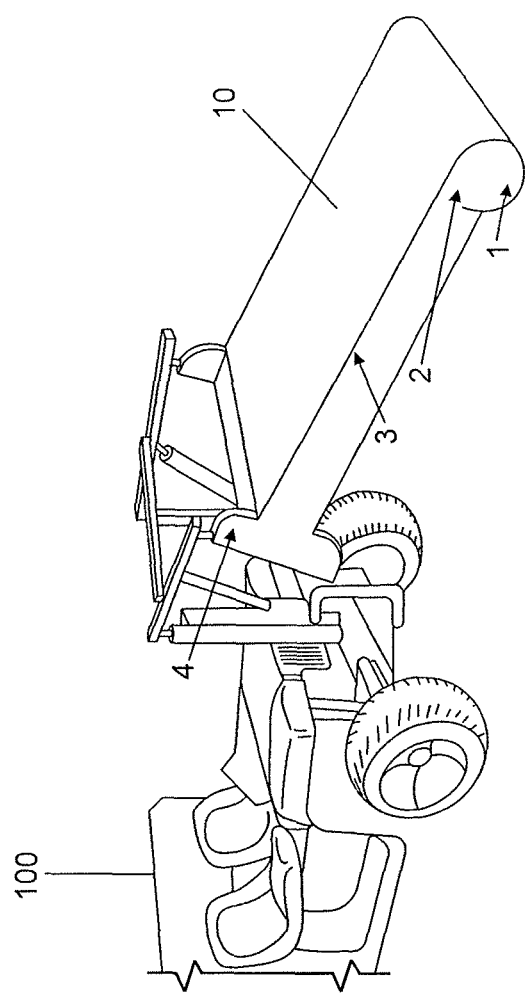
FIG. 1 depicts an element of a vee dipole array and a vee dipole array deployed on a motorized vehicle according to an embodiment consistent with this disclosure.
Figure 1:
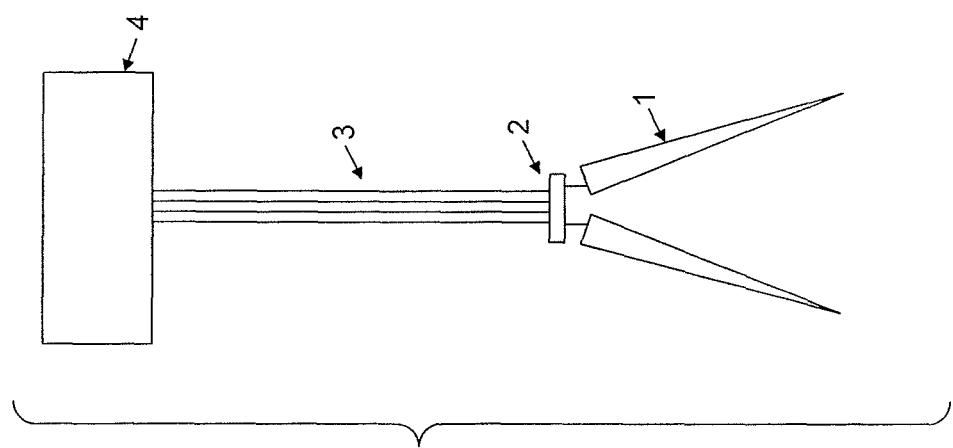

FIG. 1 depicts a UWB GPR system for detecting shallow objects consistent with the current disclosure. A resistive vee antenna 1 can be used to transmit and/or receive pulses of electromagnetic radiation. The antenna 1 can be a highly resistive, low metal content antenna. The legs of the antenna 1 can be tapered, increasing along each leg of the vee antenna 1 toward the proximal end, so as to create a resistively tapered vee (RTV) antenna. This taper can be linear in order to vary impedance gradually and thereby reduce reflection across a broad spectral band. The antenna 1 can be connected to a coupling feedbox 2, which in turn can be connected to a transmission line 3, which in turn can be connected to a multiplexer and subsequent processor module 4. These elements can be contained in a panel 10 which may be mounted to a vehicle 100. The transmission line 3 can be made long and straight, and can be rigidly attached to a flat surface. This can maintain transmission line elements for multiple antennas 1 in parallel while allowing the antennas 1 to be placed far from the vehicle 100, thereby reducing signal interference from the vehicle. The antenna 1 is depicted as a vee in FIG. 1, having a focus and field of view that can be oriented primarily towards the ground. This can reduce signals reflected by the framework holding the antenna 1. However, other antenna configurations, such as a resistive dipole 5, rod 6, or spiral 7 can be used in alternate embodiments.

Figure 2:
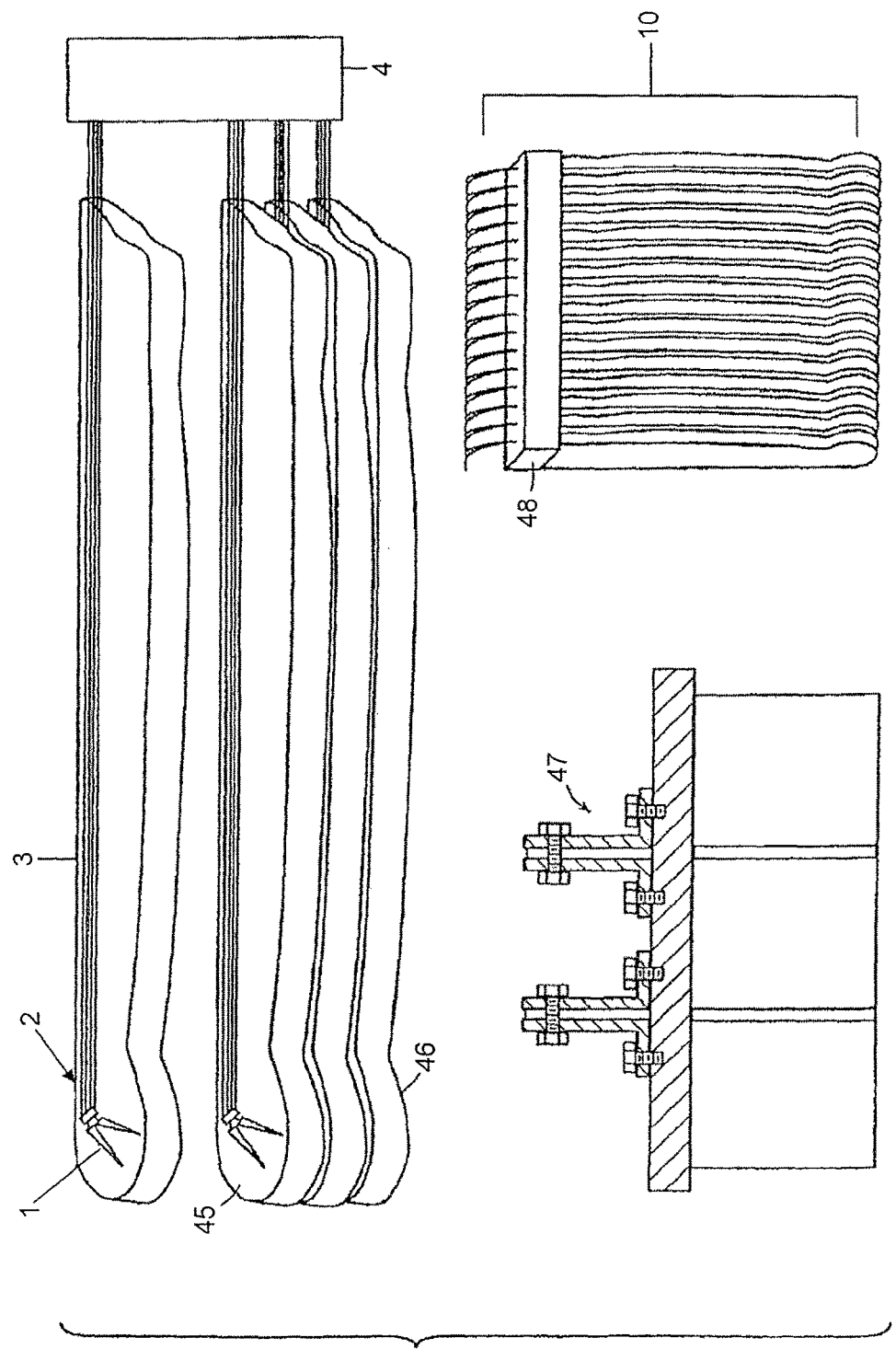
FIG. 2 depicts several views of a vee dipole array according to an embodiment consistent with this disclosure.

FIG. 2 depicts a panel 10 which can be used in a UWB GPR system for detecting shallow objects. As in FIG. 1, an antenna 1 can be connected to a coupling feedbox 2, which in turn can be connected to a transmission line 3, which in turn can be connected to a multiplexer and subsequent processor module 4. The antenna 1, feedbox 2, and transmission line 3 can be disposed on low radar cross section (LRC) sheets of plastic 45. Multiple sheets 45, each containing an antenna 1, feedbox 2, and transmission line 3, can constitute an antenna array with the multiple transmission lines 3 being fed into the multiplexer and subsequent processor module 4. The processor module 4 can provide input signals to transmitting antennas 1 for emission into the ground. The processor module 4 can also receive reflected signals from receiving antennas 1, perform signal processing on them (which can include removal of known self-signature noise), and output data to a processor or display for a user (not pictured). Sheets of LRC foam 46 separate the LRC sheets of plastic 45. The LRC elements 45 and 46 can protrude into a metal or high-strength plastic frame 48 and can be fastened to angled metal or high-strength plastic members 47. When fastened to one another, the LRC elements 45 and 46 and the frame 48 can form the panel 10.

Figure 3:
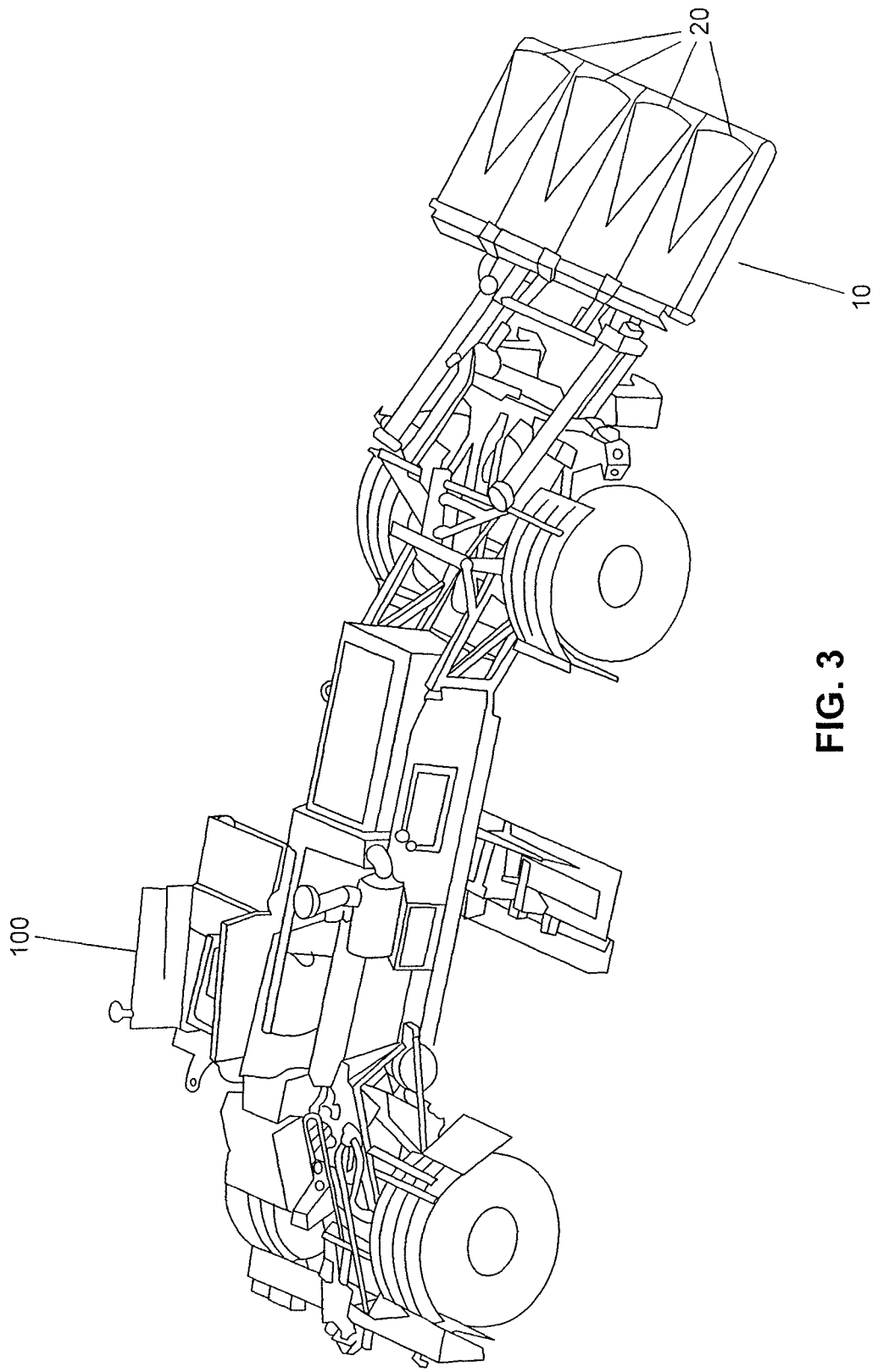
FIG. 3 depicts a large resistive vee dipole antenna combined with a vee dipole array deployed on a motorized vehicle according to an embodiment consistent with this disclosure.

FIG. 3 depicts an embodiment consistent with this disclosure mounted on a vehicle 100. Panel 10 containing a UWB GPR system for detecting shallow objects can be mounted on the front of the vehicle 100. Though FIG. 3 shows the panel 10 mounted to the front of the vehicle 100, in other embodiments consistent with this disclosure, the panel 10 can be mounted elsewhere on the vehicle 100. Multiple resistive vee dipole antenna assemblies 20 can be disposed on the top of the panel 10. Antenna assemblies can also be disposed on the bottom of panel 10. The antennas of assemblies 20 can be larger than the antennas 1 located inside the panel 10. The larger antennas can be employed for operation with lower center frequency signals than the signals transmitted and received by the smaller antennas 1. The lower frequency pulses transmitted and received by the large antennas may provide GPR images of larger, more deeply buried objects, while the higher frequency pulses transmitted and received by small antennas 1 may image smaller and shallower objects. Aside from the difference in frequency, the larger antennas can be used in a similar fashion as described above with respect to the smaller antennas 1. A processor module can provide input signals to transmitting antennas for emission into the ground. The processor module can also receive reflected signals from receiving antennas, perform signal processing on them, and output data to a processor or display for a user. When an antenna assembly 20 is oriented as shown in FIG. 3, its focus and field of view may be into the ground. Panel 10 may be fixed in place, or its orientation with respect to the ground may be adjustable.

Figure 4A:
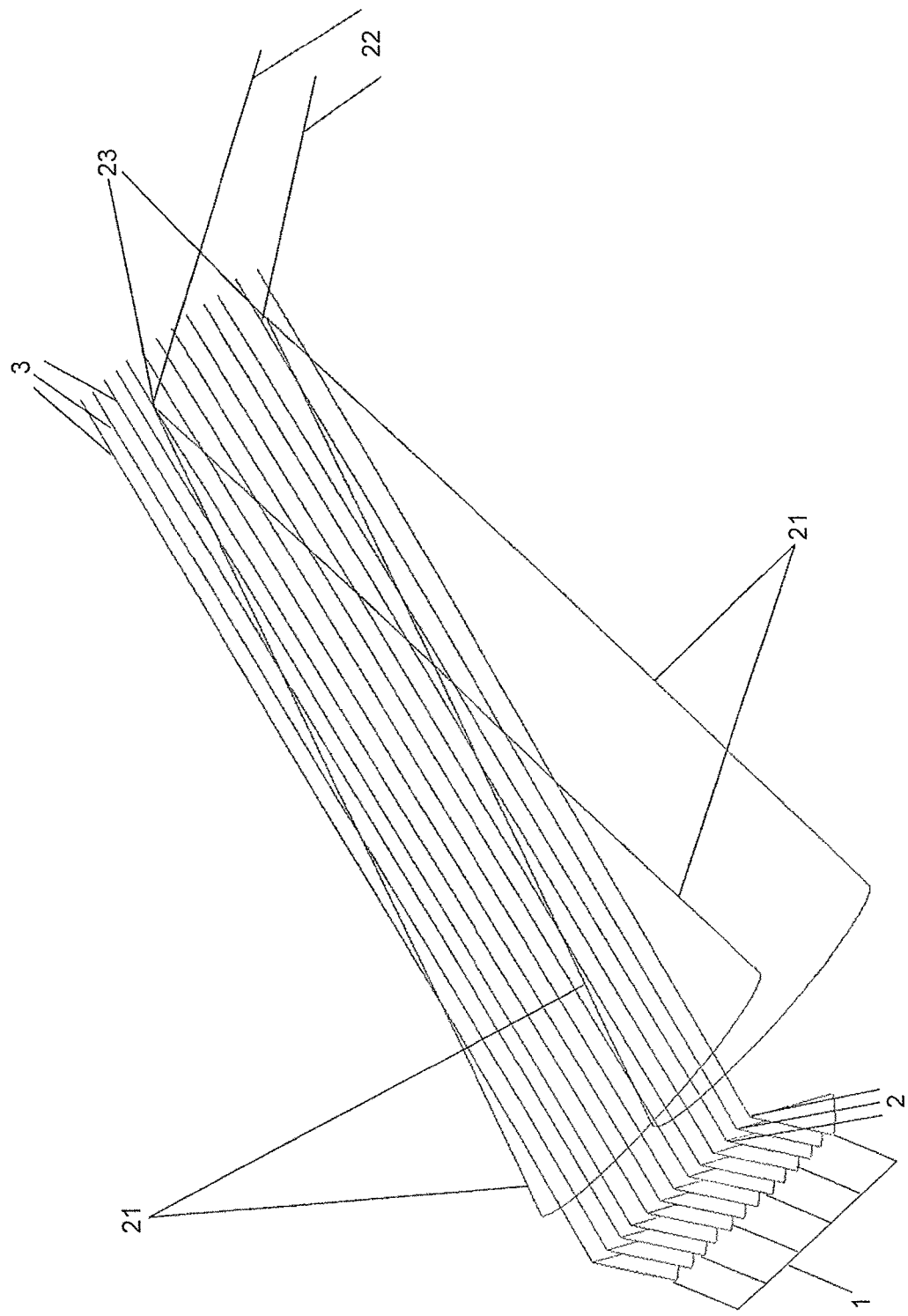
FIG. 4A depicts a schematic perspective view of a large resistive vee dipole antenna combined with a vee dipole array according to an embodiment consistent with this disclosure.
Figure 4B:
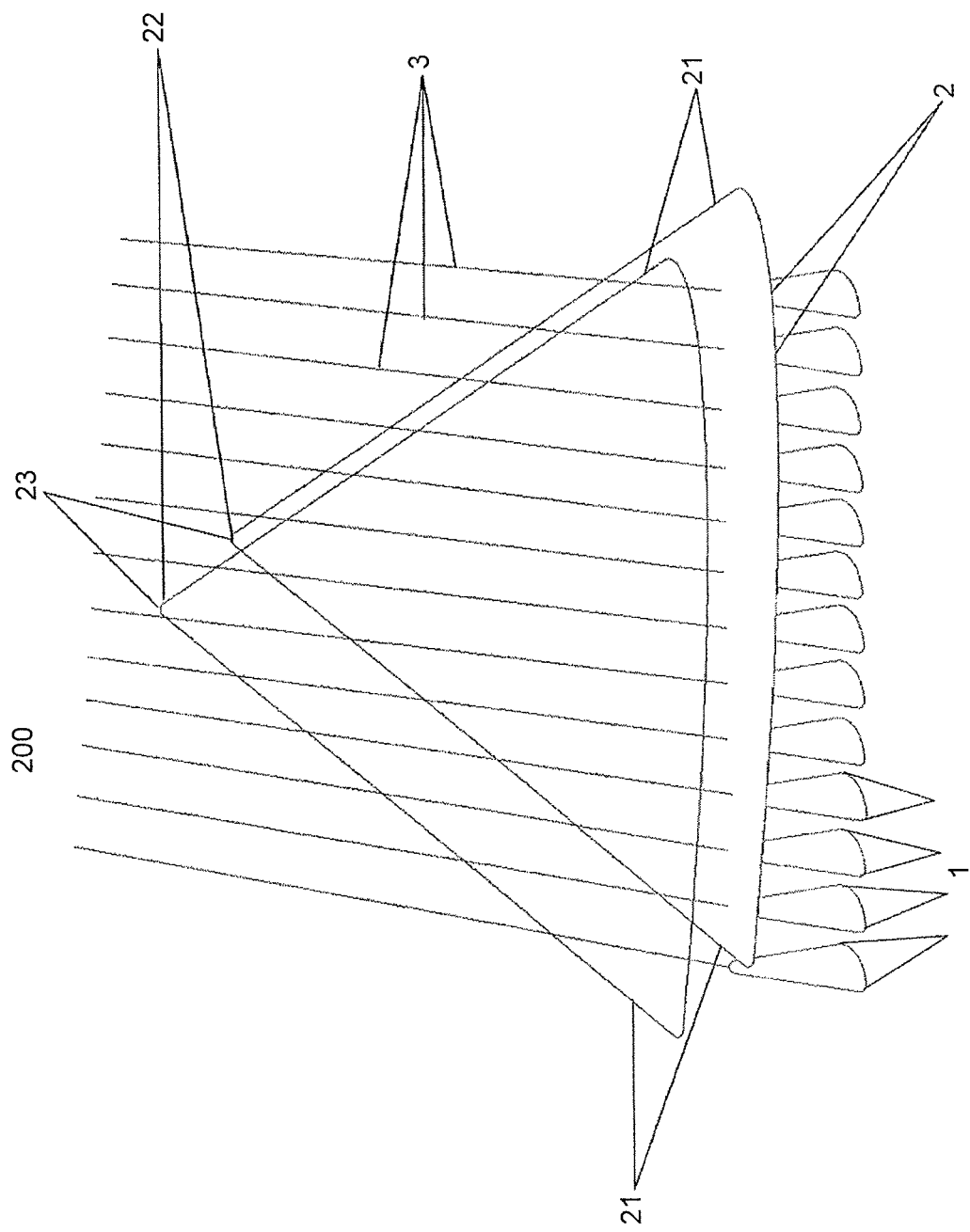
FIG. 4B depicts an alternate schematic perspective view of a large resistive vee dipole antenna combined with a vee dipole array according to an embodiment consistent with this disclosure.
Figure 4C:
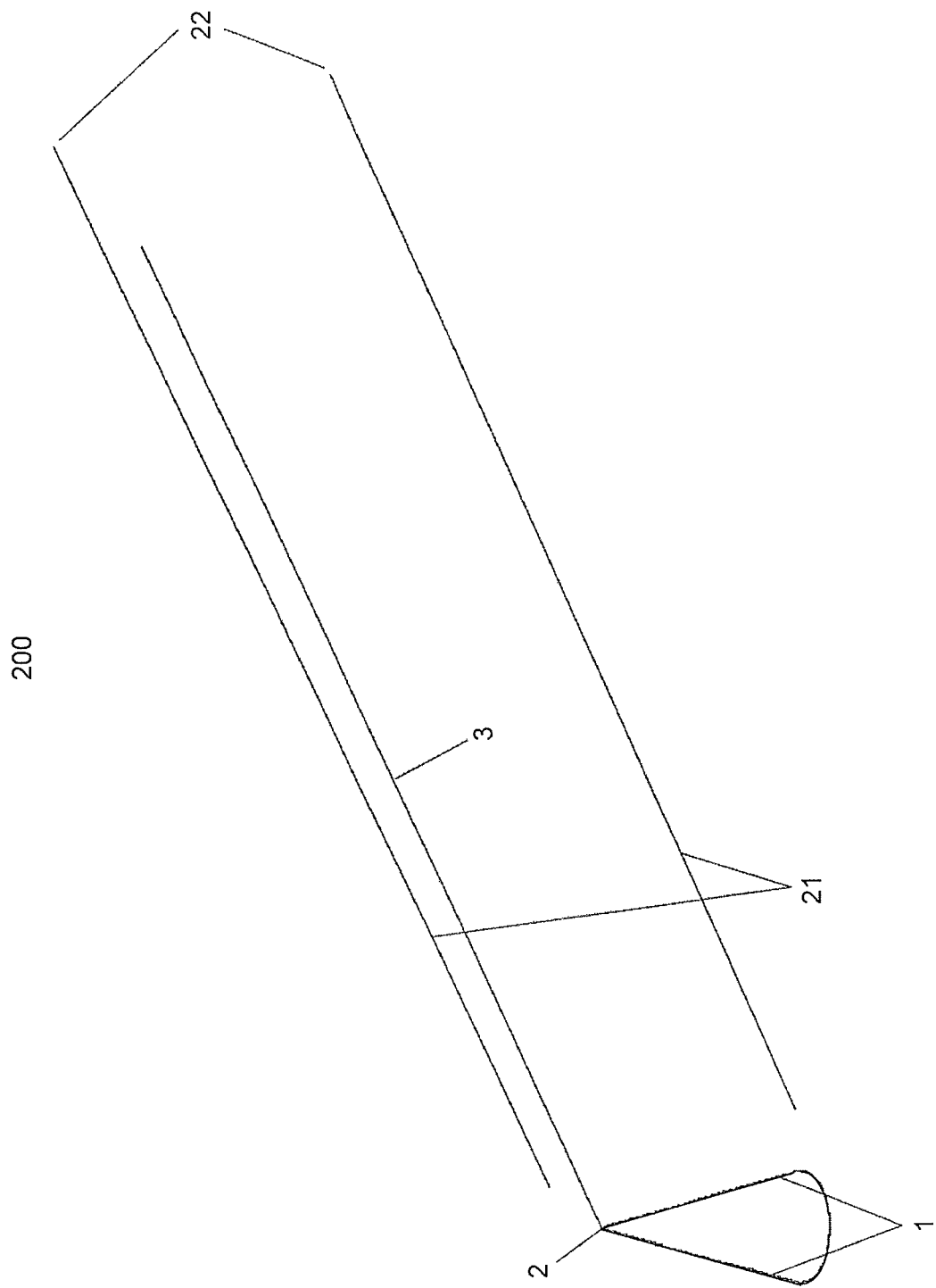
FIG. 4C depicts a schematic side elevation view of a large resistive vee dipole antenna combined with a vee dipole array according to an embodiment consistent with this disclosure.

FIGS. 4A-4C provide detailed views from multiple angles of the large antenna assembly 20 and its orientation with respect to the smaller antennas 1, according to an embodiment consistent with this disclosure. An antenna assembly 20 can comprise antennas 21, coupling feedbox 23, and transmission line 22. The shape, size, and materials of the antennas 21 can be selected to provide a large aperture suitable for low-frequency operations and a low radar cross-section. The embodiments of FIGS. 4A-4C can use resistive vee dipole antennas because they have these characteristics. A low radar cross-section may reduce coupling between the large antennas 21 and the smaller antennas 1. Therefore, it can be possible to search for large, deep objects and small, shallow objects simultaneously. The views of FIGS. 4A-4C depict two large antenna assemblies 20 per view. This represents an embodiment of the invention wherein a transmitting antenna can be located on one side of the panel 10 and a receiving antenna can be located on the other side of the panel 10. A transmitting antenna 21 can be on the top and a receiving antenna 21 can be on the bottom, or a receiving antenna 21 can be on the top and a transmitting antenna 21 can be on the bottom. It will be understood by one skilled in the relevant art that other antenna arrangements can be possible. For example, both transmitting and receiving antennas 21 can be located on the same side (either the top or the bottom) of the panel 10.

Figure 5:
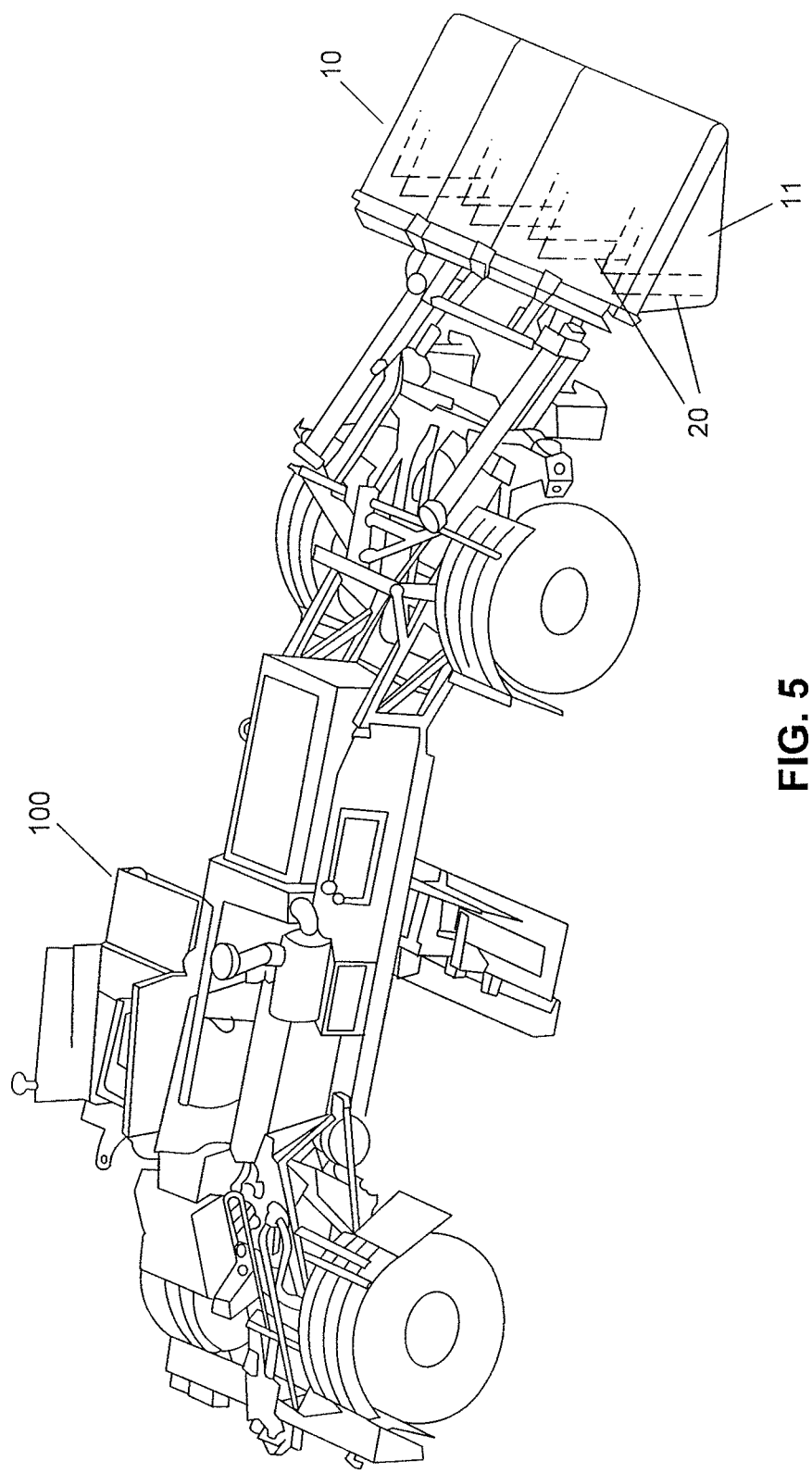
FIG. 5 depicts a large resistive vee dipole antenna combined with a vee dipole array deployed on a motorized vehicle according to an embodiment consistent with this disclosure.

FIG. 5 depicts an embodiment of the present invention mounted on a vehicle 100. Panel 10, containing an existing UWB GPR system for detecting shallow objects can be mounted on the front of the vehicle 100. A secondary panel 11 can extend from the bottom of panel 10. In the example of FIG. 5, this secondary panel 11 can be a wedge-shaped enclosure which can contain or provide a mounting surface for the antennas of assemblies 20. In other embodiments, the secondary panel 11 can be a flat panel extending from the panel 10 and oriented in a vertical direction, or the angle between the panel 10 and the secondary panel 11 can be different in other embodiments of the invention. Multiple resistive vee dipole antenna assemblies 20 can be disposed on a flat side of a wedge-shaped secondary panel 11, within a wedge-shaped secondary panel 11, or on either side of a flat secondary panel 11. As in the embodiment of FIG. 3, the antennas of assemblies 20 can be much larger than the antennas 1 located inside the panel 10. The larger antennas can be suited for operation with lower center frequency signals than the signals transmitted and received by the smaller antennas 1. The low frequency pulses transmitted and received by the large antennas can provide GPR images of large, deeply buried objects, while the higher frequency pulses transmitted and received by small antennas 1 can image smaller and shallower objects. When an antenna assembly 20 is oriented as shown in FIG. 5, its focus and field of view can be into the ground.

Figure 6A:
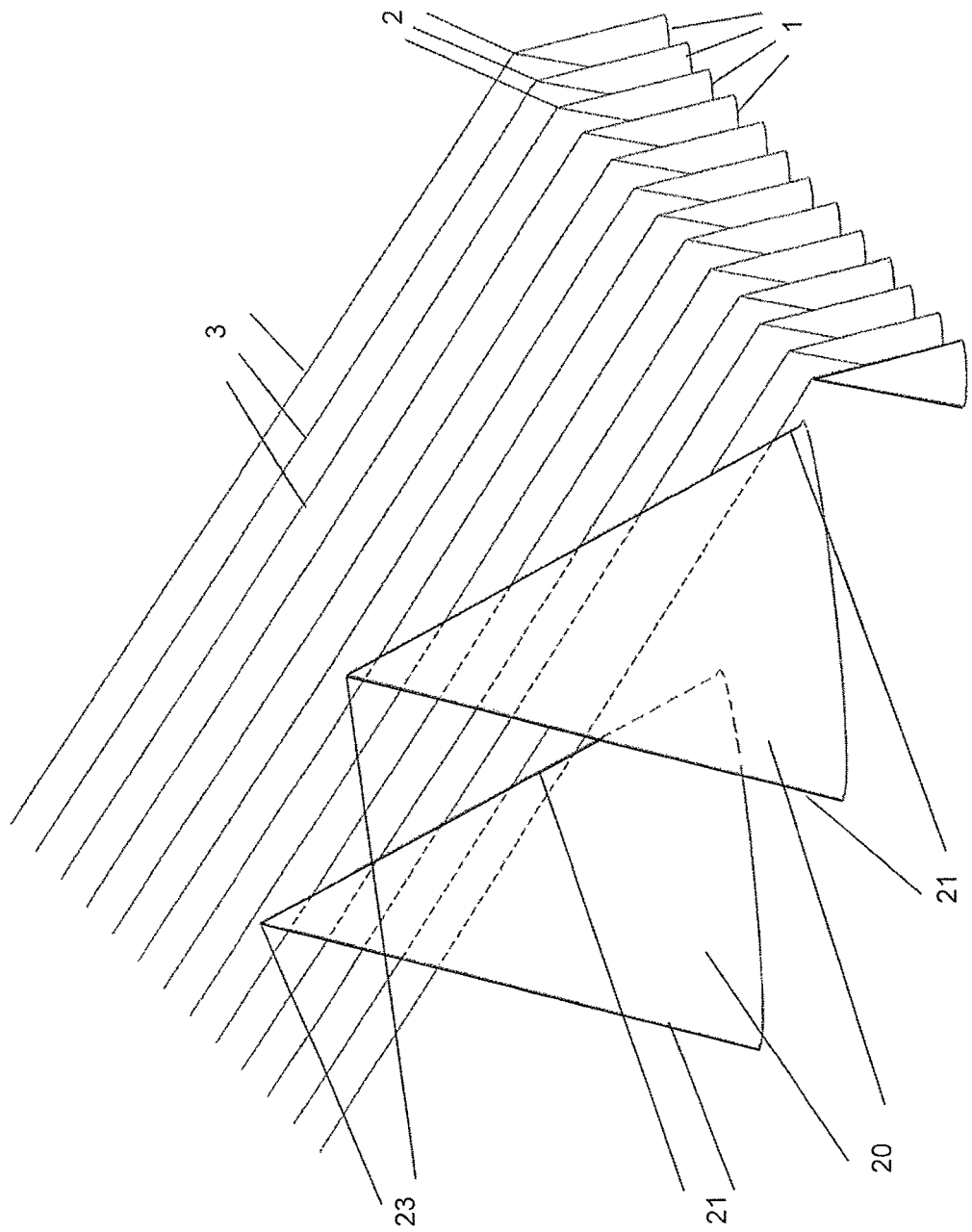
FIG. 6A depicts a schematic perspective view of a large resistive vee dipole antenna combined with a vee dipole array according to an embodiment consistent with this disclosure.
Figure 6B:
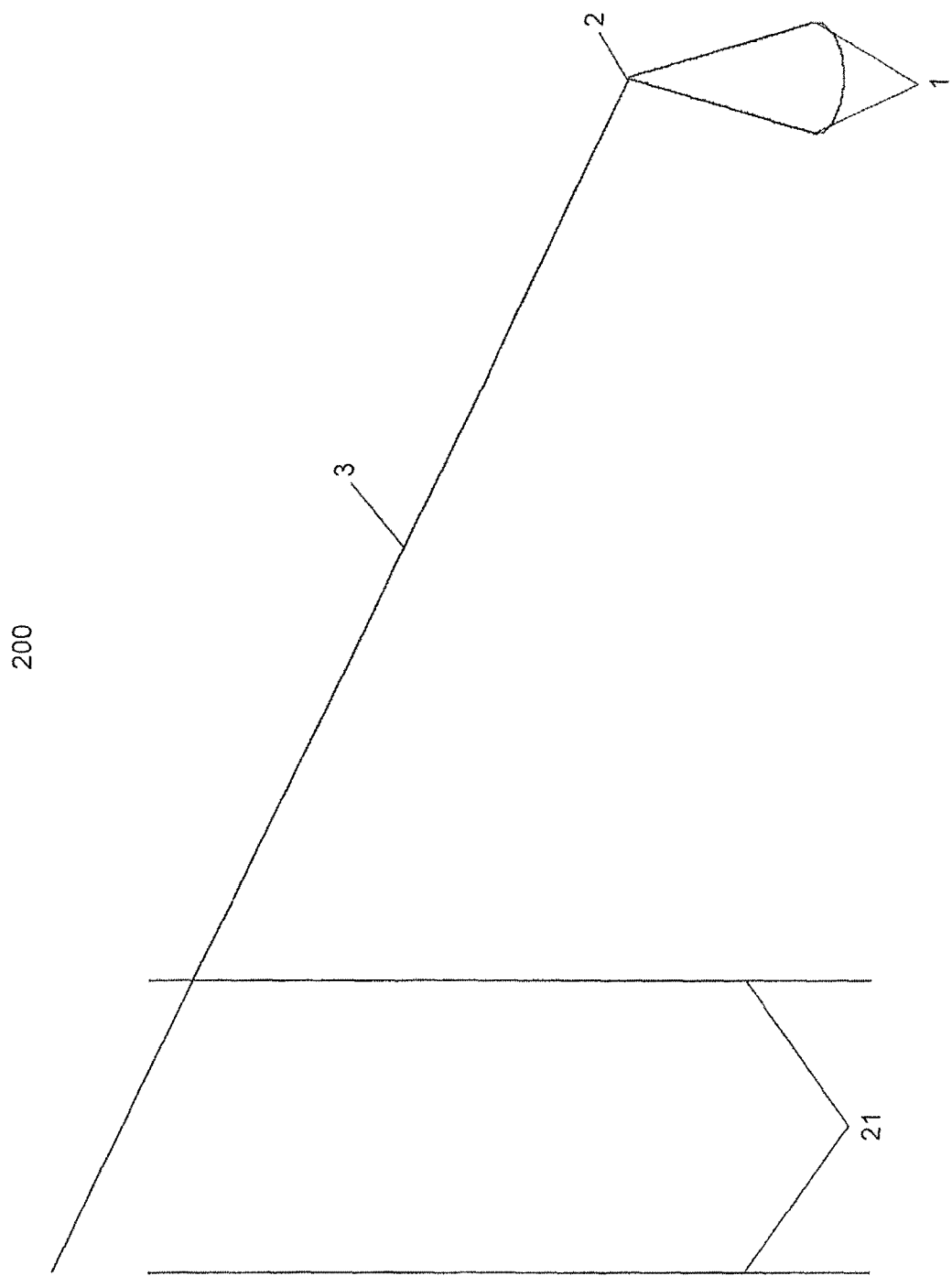
FIG. 6B depicts a schematic side elevation view of a large resistive vee dipole antenna combined with a vee dipole array according to an embodiment consistent with this disclosure.

FIGS. 6A-6B provide detailed views from multiple angles of the large antenna assembly 20 and their orientation with respect to the smaller antennas 1, according to an embodiment consistent with this disclosure. An antenna assembly 20 can consist of antennas 21, coupling feedboxes 23, and transmission lines 22. Similarly to the embodiments of FIGS. 4A-4C, resistive vee dipole antennas can be used in the embodiments of FIGS. 6A-6B in order to reduce coupling between the large antennas 21 and the small antennas 1 and allow for simultaneous detection of large, deep objects and small, shallow objects. The views of FIGS. 6A-6B depict two large antennas 21 per view. This represents an embodiment consistent with this disclosure wherein a secondary panel 11 can be present, and a transmitting antenna can be located on one side of the secondary panel 11 and a receiving antenna can be located on the other side of the secondary panel 11. A transmitting antenna 21 can be on a front side of the secondary panel 11 and a receiving antenna 21 can be on a rear side of the secondary panel 11, or a receiving antenna 21 can be on the front side and a transmitting antenna 21 can be on the rear side.

Several embodiments are possible with variations on the embodiments of FIGS. 4A-4C and FIGS. 6A-6B. Antenna assembly 20 can be oriented with one antenna 21 directly across from another antenna 21 on opposite sides of the panel 10 or secondary panel 11, as shown, or the antennas 21 can be arranged so as not to be directly aligned. An angle between the poles of the antenna 21 can be narrow to provide a highly directional GPR signal, or the angle can be wide to provide a less directional GPR signal with a wider field of view. Additionally, antennas 21 can be oriented in a wide range of directions in the embodiment of FIGS. 4A-4C. For example, the GPR signal can be directed into the ground by the transmitting antenna 21 at a nearly perpendicular angle to the surface of the ground at one extreme or a more nearly parallel angle to the surface of the ground at the other extreme. In some embodiments, non-equal numbers of transmitting antennas 21 and receiving antennas 21 can be provided. Some embodiments can direct high frequency GPR signals and low frequency GPR signals to the same ground surface location at the same time, whereas other embodiments can direct the different signals to different locations. In these latter embodiments, the return images can be collocated for presentation to a user, or they can be kept separate. The antenna assembly 20 can comprise an antenna 21 formed on a rigid or flexible substrate, or antennas 21 can be constructed without a substrate or other backing and installed directly on the panel 10 or secondary panel 11. In these embodiments, the angle between poles of the antenna 21 can be variable. Signal noise may be compensated for in some embodiments through the interposition of radar-absorbing materials between the antennas 21 and the vehicle 100, through the use of algorithmic filtering during processing of received signals, or by other techniques. Some embodiments consistent with the disclosure can optionally be employed as modifications to existing GPR arrays, and other embodiments can be new GPR arrays.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it can be utilized in ways other than that shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for detecting objects buried beneath a surface of a medium comprising:
    drawing a high-frequency array and a low frequency array across the surface, the high-frequency array comprising a plurality of high frequency antennas, the low frequency array comprising at least one-low frequency resistive vee dipole transmittal antenna and at least one low-frequency resistive vee dipole receiving antenna, wherein the at least one low-frequency resistive vee dipole transmitting antenna is configured to transmit electromagnetic waves in a direction orthogonal to electromagnetic waves transmitted by at least one of the high-frequency antennas;
    transmitting a plurality of high-frequency pulses of electromagnetic radiation with the high-frequency array;
    transmitting a plurality of low-frequency pulses of electromagnetic radiation with the low-frequency array;
    receiving the plurality of high-frequency pulses with the high-frequency array after interaction with the medium;
    receiving the plurality of low-frequency pulses with the low-frequency array after interaction with the medium;
    processing the plurality of high-frequency pulses; and
    processing the plurality of low-frequency pulses.

2. The method of claim 1, further comprising:
    generating data from the processing of the plurality of high-frequency pulses and the processing of low-frequency pulses; and
    displaying the data to a user.

3. The method of claim 1, wherein:
    the at least one low-frequency resistive vee dipole transmitting antenna is disposed on a top side of a panel; and
    the at least one low-frequency resistive vee dipole receiving antenna is disposed on a bottom side of the panel.

4. The method of claim 1, wherein:
    the at least one low-frequency resistive vee dipole receiving antenna is disposed on a top side of a panel; and
    the at least one low-frequency resistive vee dipole transmitting antenna is disposed on a bottom side of the panel.

5. The method of claim 1, wherein:
    the at least one low-frequency resistive vee dipole receiving antenna is disposed on a top side of a panel; and
    the at least one low-frequency resistive vee dipole transmitting antenna is disposed on the top side.

6. The method of claim 1, wherein:
    the at least one low-frequency resistive vee dipole receiving antenna is disposed on a bottom side of a panel; and
    the at least one low-frequency resistive vee dipole transmitting antenna is disposed on the bottom side.

7. The method of claim 1, wherein the plurality of high-frequency antennas are high-frequency resistive vee dipole antennas.

8. The method of claim 1, wherein:
    at least one of the plurality of high-frequency antennas is a high-frequency transmitting antenna operable to transmit a first signal having a first center frequency; and
    the at least one low-frequency resistive vee dipole transmitting antenna is operable to transmit a second signal having a lower center frequency than the first center frequency.

9. The method of claim 1, wherein the panel is mounted to a vehicle.

10. The method of claim 9, wherein the panel has an adjustable orientation.

11. The method of claim 1, wherein the at least one low-frequency resistive vee dipole transmitting antenna and the at least one low-frequency resistive vee dipole receiving antenna are formed on at least one substrate.

12. The method of claim 1, wherein:
the at least one low-frequency resistive vee dipole transmitting antenna comprises at least one pair of transmitting antenna poles, and
the at least one low-frequency resistive vee dipole receiving antenna comprises at least one pair of receiving antenna poles.

13. The method of claim 12, wherein each of the transmitting antenna poles and receiving antenna poles is tapered.

14. The method of claim 12, wherein:
an at least one first angle between each pair of transmitting antenna poles is adjustable, and
an at least one second angle between each pair of receiving antenna poles is adjustable.

15. The method of claim 1, wherein:
the high-frequency array is connected to a first panel; and
the low-frequency array is connected to a second panel.

16. The method of claim 15, wherein:
the second panel comprises at least one flat side;
the at least one low-frequency resistive vee dipole transmitting antenna is disposed on the at least one flat side; and
the at least one low-frequency resistive vee dipole receiving antenna is disposed on the at least one flat side.

17. The method of claim 15, wherein the second panel comprises a front side and a rear side.

18. The method of claim 17, wherein:
the at least one low-frequency resistive vee dipole receiving antenna is disposed on the front side; and
wherein the at least one low-frequency resistive vee dipole transmitting antenna is disposed on the front side.

19. The method of claim 17, wherein:
the at least one low-frequency resistive vee dipole receiving antenna is disposed on the rear side; and
wherein the at least one low-frequency resistive vee dipole transmitting antenna is disposed on the rear side.

20. The method of claim 15, wherein:
the at least one low-frequency resistive vee dipole transmitting antenna is disposed on the front side; and
wherein the at least one low-frequency resistive vee dipole receiving antenna is disposed on the rear side.

* * * * *